(12) United States Patent
Siddiqui

(10) Patent No.: US 12,395,396 B2
(45) Date of Patent: *Aug. 19, 2025

(54) TECHNIQUES FOR ACCESSING LOGICAL NETWORKS VIA A VIRTUALIZED GATEWAY

(71) Applicant: Amazon Technologies, Inc., Seattle, WA (US)

(72) Inventor: Ahmed Fuad Siddiqui, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,340

(22) Filed: Jul. 10, 2023

(65) Prior Publication Data

US 2023/0353444 A1 Nov. 2, 2023

Related U.S. Application Data

(63) Continuation of application No. 18/086,013, filed on Dec. 21, 2022, now Pat. No. 11,743,101, which is a
(Continued)

(51) Int. Cl.
*H04L 67/08* (2022.01)
*H04L 9/40* (2022.01)
(Continued)

(52) U.S. Cl.
CPC .............. *H04L 41/045* (2022.05); *H04L 9/40* (2022.05); *H04L 12/4633* (2013.01); *H04L 12/4641* (2013.01); *H04L 41/04* (2013.01); *H04L 41/0896* (2013.01); *H04L 41/0897* (2022.05); *H04L 41/5054* (2013.01); *H04L 63/0272* (2013.01); *H04L 63/08* (2013.01);
(Continued)

(58) Field of Classification Search
CPC ....... H04L 41/04; H04L 41/5054; H04L 9/40; H04L 12/4633; H04L 12/0896; H04L 63/0277; H04L 67/02; H04L 67/08; H04L 67/10; H04L 69/29; H04L 69/329
USPC .......................... 709/220, 224, 226, 227, 228
See application file for complete search history.

(56) References Cited

U.S. PATENT DOCUMENTS 6,850,497 B1 * 2/2005 Sigler .................. H04B 7/1853
455/526
8,595,378 B1 * 11/2013 Cohn ...................... G06F 9/455
709/239
(Continued)

FOREIGN PATENT DOCUMENTS

AU 2013232273 A1 * 9/2014 ......... G06F 9/45533
CA 2836387 A1 * 11/2012 ......... H04L 63/0281

*Primary Examiner* — Khanh Q Dinh
(74) *Attorney, Agent, or Firm* — Klarquist Sparkman, LLP

(57) ABSTRACT

Disclosed are various embodiments for receiving, via a network, a request from a client to establish a network tunnel over the network. Various embodiments can create a virtual network comprising a virtual network gateway in response to receiving a service call. Various embodiments can further allocate an available computing resource to the virtual network gateway to augment a first computing resource. Allocating the available computing resource can be performed in response to a usage of the first computing resource assigned to the virtual network gateway.

19 Claims, 6 Drawing Sheets

Related U.S. Application Data continuation of application No. 17/484,917, filed on Sep. 24, 2021, now Pat. No. 11,570,035, which is a continuation of application No. 16/692,327, filed on Nov. 22, 2019, now Pat. No. 11,146,443, which is a continuation of application No. 16/179,198, filed on Nov. 2, 2018, now Pat. No. 10,505,784, which is a continuation of application No. 15/912,843, filed on Mar. 6, 2018, now Pat. No. 10,129,074, which is a continuation of application No. 15/426,225, filed on Feb. 7, 2017, now Pat. No. 9,912,520, which is a continuation of application No. 13/683,658, filed on Nov. 21, 2012, now Pat. No. 9,571,331.

(51) Int. Cl.

| | | |
|---|---|---|
| *H04L 12/46* | (2006.01) | |
| *H04L 41/04* | (2022.01) | |
| *H04L 41/045* | (2022.01) | |
| *H04L 41/0896* | (2022.01) | |
| *H04L 41/0897* | (2022.01) | |
| *H04L 41/5054* | (2022.01) | |
| *H04L 67/02* | (2022.01) | |
| *H04L 67/10* | (2022.01) | |
| *H04L 67/1008* | (2022.01) | |
| *H04L 67/141* | (2022.01) | |
| *H04L 69/24* | (2022.01) | |
| *H04L 69/329* | (2022.01) | |

(52) U.S. Cl.
CPC .............. *H04L 63/10* (2013.01); *H04L 67/02* (2013.01); *H04L 67/08* (2013.01); *H04L 67/10* (2013.01); *H04L 67/1008* (2013.01); *H04L 67/141* (2013.01); *H04L 69/24* (2013.01); *H04L 69/329* (2013.01)

(56) References Cited

U.S. PATENT DOCUMENTS

| | | | |
|---|---|---|---|
| 8,738,745 B1* | 5/2014 | Brandwine | H04L 67/34 709/224 |
| 8,843,600 B1* | 9/2014 | Gabrielson | H04L 12/6418 709/224 |
| 8,995,301 B1* | 3/2015 | Miller | H04L 45/121 370/338 |
| 9,036,504 B1* | 5/2015 | Miller | H04L 45/02 370/254 |
| 9,203,747 B1* | 12/2015 | Brandwine | H04L 45/64 |
| 9,524,167 B1* | 12/2016 | Cohn | H04L 41/0886 |
| 9,571,331 B1* | 2/2017 | Siddiqui | H04L 41/0897 |
| 10,938,626 B2* | 3/2021 | Gupta | H04L 67/1031 |
| 10,938,641 B1* | 3/2021 | Fritz | H04L 63/08 |
| 11,570,035 B2* | 1/2023 | Siddiqui | H04L 41/045 |
| 11,743,101 B2* | 8/2023 | Siddiqui | H04L 67/08 709/224 |
| 2011/0022721 A1* | 1/2011 | Diab | H04L 69/324 709/233 |
| 2012/0254353 A1* | 10/2012 | Baba | H04L 12/4641 709/217 |
| 2013/0138816 A1* | 5/2013 | Kuo | G06F 9/5011 709/226 |
| 2014/0032169 A1* | 1/2014 | McCarthy | G05B 19/4184 702/182 |
| 2015/0117179 A1* | 4/2015 | Sato | H04L 45/586 370/219 |
| 2015/0215414 A1* | 7/2015 | Kariman | H04L 67/55 709/223 |
| 2016/0197834 A1* | 7/2016 | Luft | H04L 12/46 709/223 |
| 2016/0197835 A1* | 7/2016 | Luft | H04L 67/63 709/223 |
| 2016/0198003 A1* | 7/2016 | Luft | H04L 67/63 709/225 |
| 2016/0218918 A1* | 7/2016 | Chu | H04L 41/12 |
| 2017/0180183 A1* | 6/2017 | Siddiqui | H04L 69/329 |

* cited by examiner

TECHNIQUES FOR ACCESSING LOGICAL NETWORKS VIA A VIRTUALIZED GATEWAY

CROSS REFERENCE TO RELATED APPLICATIONS

This continuation application claims priority to, and the benefit of, co-pending U.S. patent application Ser. No. 18/086,013, entitled "Techniques for Accessing Logical Networks via a Virtualized Gateway" and filed on Dec. 21, 2022, which is a continuation of U.S. Pat. No. 11,570,035, entitled "Techniques for Accessing Logical Networks via a Virtualized Gateway" and issued on Jan. 31, 2023, which is a continuation of U.S. Pat. No. 11,146,443, entitled "Techniques for Accessing Logical Networks via a Virtualized Gateway" and issued on Oct. 12, 2021, which is a continuation of U.S. Pat. No. 10,505,784, entitled "Techniques for Accessing Logical Networks via a Virtualized Gateway" and issued on Dec. 10, 2019, which is a continuation of U.S. Pat. No. 10,129,074, entitled "Techniques for Accessing Logical Networks via a Virtualized Gateway" and issued on Nov. 13, 2018, which is a continuation of U.S. Pat. No. 9,912,520, entitled "Techniques for Accessing Logical Networks via a Virtualized Gateway" and issued on Mar. 6, 2018, which is a continuation application of U.S. Pat. No. 9,571,331, entitled "Techniques for Accessing Local Networks via a Virtualized Gateway" and filed on Nov. 21, 2012, and issued on Feb. 14, 2017.

BACKGROUND

People use computing devices to communicate with other computing devices and with each other. Sometimes people are dispersed to remote and/or different locations, but still need to communicate as if they were centrally located.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to programmatically configuring and accessing a logical network through which one or more client devices may communicate with other computing devices within the logical network. The users connect to the logical network by establishing a logical network tunnel between the client device and the logical network gateway in the computing device. The logical network gateway may be a virtual machine configured with information about the users who may establish logical network tunnels and the one or more logical networks to which the users may connect. In the following discussion, a general description of the system and its components is provided, followed by a discussion of the operation of the same.

Figure 1:
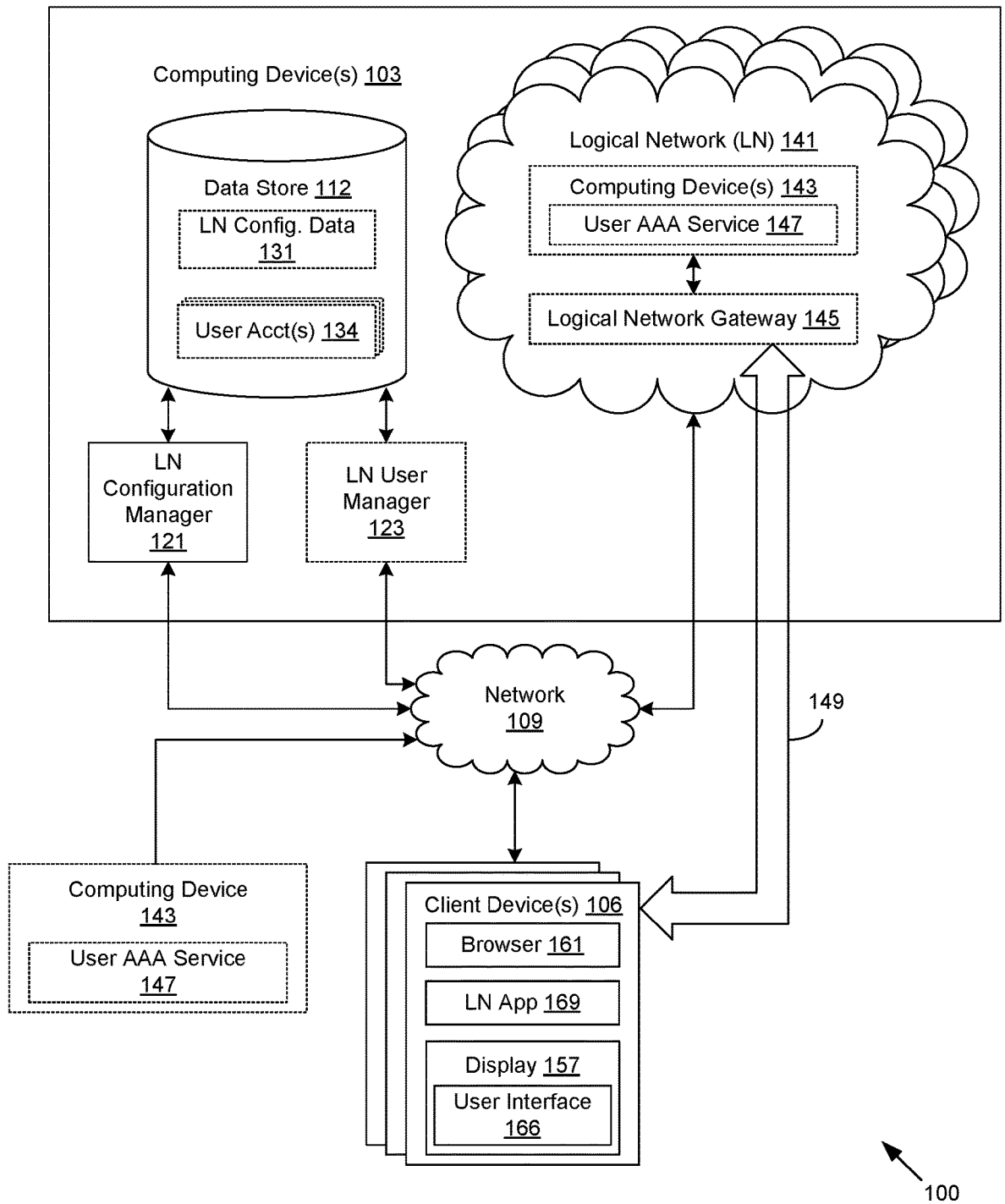
FIG. 1 is a drawing of a networked environment according to various embodiments of the present disclosure.

With reference to FIG. 1, shown is a networked environment 100 according to various embodiments. The networked environment 100 includes one or more computing devices 103, one or more client devices 106 and one or more computing device 143 communicating by way of a network 109. The network 109 includes, for example, the Internet, intranets, extranets, wide area networks (WANs), local area networks (LANs), wired networks, wireless networks, or other suitable networks, etc., or any combination of two or more such networks.

Each computing device 103 may be operated by a cloud computing service provider or other provider. The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though each computing device 103 is referred to in the singular, it is understood that a plurality may be employed in the various arrangements as described above.

The logical network 141 is a logical network created and operated by the computing device 103. The logical network 141 may include various virtual or actual devices, such as one or more computing devices 143 and/or client devices 106. The logical network 141 facilitates the appearance of an exclusive network and/or internetwork through which devices within the logical network 141 may communicate with other devices located inside and potentially outside the logical network 141.

The computing device 143 may comprise one or more virtual computers operated on the computing device 103, or the computing device 143 may comprise, for example, a server computer or any other system providing computing capability. Alternatively, a plurality of computing devices 143 may be employed that are arranged, for example, in one or more server banks or computer banks or other arrangements. A plurality of computing devices 143 together may comprise, for example, a cloud computing resource, a grid computing resource, and/or any other distributed computing arrangement. Such computing devices 143 may be located in a single installation or may be distributed among many different geographical locations. Furthermore, in various embodiments, the computing device 143 may or may not be logically present in the logical network 141. For purposes of convenience, the computing device 143 is referred to herein in the singular. Even though each computing device 143 is referred to in the singular, it is understood that a plurality may be employed in the various arrangements as described above.

Various applications and/or other functionality may be executed in the computing device 143 according to various embodiments. The components executed on the computing device 143, for example, may include the user AAA service 147. The user AAA service 147 may additionally provide authentication, authorization and/or accounting (AAA) services to the logical network 141, logical network gateway 145 and/or other services and devices. The services may be offered using protocols such as Terminal Access Controller Access-Control System Plus (TACACS+), Remote Authentication Dial-In User Service (RADIUS), Diameter or other protocols as can be appreciated.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a logical network configuration manager 121, a logical network user manager 123 and a logical network gateway 145. The components executed on the computing device 103 may also include other applications, services, processes, systems, engines, or functionality not discussed in detail herein. The data stored in the data store 112 includes data that may be accessed by the applications, for example, logical network configuration data 131 and user accounts 134, as well as potentially other data.

In various embodiments, the components executed on the computing device 103 may utilize any type of middleware framework to communicate with a client application executing on a client device 106 or with other applications executing on the computing device 103. Examples of such frameworks include remote procedure calls, service-oriented architecture protocol (SOAP), representational state transfer (REST), Windows Communication Foundation, and other frameworks.

The logical network configuration manager 121 may be executed to provide an interface to facilitate the creation and configuration of a logical network 141 via a programmatic service call. To this end, the logical network configuration manager 121 may be executed to install one or more computing devices 143 into the logical network 141, associate a logical network 141 with a logical network gateway 145 and configure the logical network gateway 145. In one embodiment, the interface provided by the logical network configuration manager 121 may include electronic content, such as web pages or other types of network content, that are provided to a client device 106. In another embodiment, the logical network configuration manager 121 may provide a middleware framework to communicate with a client application executing on a client device 106.

The logical network user manager 123 may be executed to provide an interface to facilitate management of user accounts for at least the logical network 141 and logical network gateway 145 via a programmatic service call. In carrying out this role, the logical network user manager 123 may enable the creation, removal, importation, exportation and editing of user and group accounts, as well as the permissions associated with the accounts. As a non-limiting example, the permissions for the user/group accounts may include whether the account may establish a tunnel, the logical network(s) to which the account may connect, the network(s) and/or device(s) to which the account may connect, etc.

In one embodiment, the interface provided by the logical network user manager 123 may include electronic content, such as web pages or other types of network content, that are provided to a client device 106. In another embodiment, the logical network user manager 123 may provide a middleware framework to communicate with a client application executing on a client device 106.

The logical network user manager 123 may additionally provide authentication, authorization and/or accounting (AAA) services to the logical network 141 and logical network gateway 145. The services may be offered using protocols such as Terminal Access Controller Access-Control System Plus (TACACS+), Remote Authentication Dial In User Service (RADIUS), Diameter or other protocols as can be appreciated.

The logical network gateway 145 may be executed as a virtual machine to provide the client device 106 with access to the logical network 141 via a logical network tunnel 149. The logical network tunnels 149 facilitate the appearance of the client device 106 being present in the logical network 141 while connecting remotely from another network, such as the Internet. Additionally, the logical network tunnel 149 may further support techniques for ensuring confidentiality, integrity and/or authentication of the communications across the logical network tunnel 149. To this end, the logical network tunnels 149 may be established using hypertext transfer protocol secure (HTTPS), Secure Socket Layer/Transport Layer Security (SSL/TLS) and/or other protocols as can be appreciated. The logical network gateway 145 may use authentication, authorization and/or accounting (AAA) services related to establishing logical network tunnels 149 with client devices 106. The services may be received using protocols such as TACACS+, RADIUS, Diameter or other protocols as can be appreciated.

The data stored in the data store 112 may include, for example, logical network configuration data 131, user accounts 134 and potentially other data. The logical network configuration data 131 may include configuration information related to the logical network 141 such as a logical network identifier, the network configuration, the computing device(s) 143 installed in the logical network 141, the logical network gateway 145 configuration, the AAA configuration for the logical network gateway 145, etc.

Each user account 134 may be associated with a respective user of the logical network 141 and may include information such as a full name, user identifier, password, membership in one or more user groups, user/group permissions, usage logs and/or other data related to the user and AAA services. As a non-limiting example, the usage logs may include the total time each account maintained a logical network tunnel 149, the number of logical network tunnels 149, total bandwidth used, etc.

The client device 106 is representative of a plurality of devices that are associated with various customers. The client device 106 may be coupled to the network 109 and may further communicate on the logical network 141 via a logical network tunnel 149. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capabilities. The client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client device 106 may be configured to execute various applications such as a browser 161, logical network application 169, and/or other applications. The browser 161 may be executed in the client device 106, for example, to access and render network pages, such as web pages, or other network content served up by the computing device 103 and/or other servers, thereby rendering a user interface 166 on the display 157. The browser 161 may further be executed in the client device 106 to facilitate establishing a logical network tunnel 149 to the logical network gateway 145 on the computing device 103.

Likewise, the logical network application 169 may be executed in the client device 106 to facilitate establishing one or more logical network tunnels 149 to the logical network gateway 145 of the computing device 103. The logical network application 169 may further be executed to manage configuration of the logical network 141, as well as access to the logical network 141 via the logical network gateway 145. In some embodiments, the logical network application 169 may be executed within a virtual machine of the client device 106, such as a virtual machine integrated within the browser 161. The client device 106 may be configured to execute applications beyond the browser 161 and the logical network application 169, such as, for example, email applications, instant message applications, and/or other applications.

Next, a general description of the operation of the various components of the networked environment 100 is provided. To begin, the client device 106 makes a request to the logical network configuration manager 121 to create a logical network 141. The request from the client device 106 to the logical network configuration manager 121 may be made via the browser 161, the logical network application 169 or another application capable of making a programmatic service request. The client device 106 may further configure the logical network 141 to include one or more network address allocations, such as a range of Internet Protocol (IP) addresses, which may be used for devices communicating on the logical network 141. Additionally, the client device 106 may further configure the logical network 141 to include one or more computing devices 143 within the logical network 141.

Furthermore, the client device 106 makes a programmatic service request to the logical network configuration manager 121 to associate a logical network gateway 145 with the logical network 141. The logical network gateway 145 will permit users to communicate within the logical network 141 through the use of logical network tunnels 149. In one embodiment, users of the logical network gateway 145 and their associated permissions are managed by the logical network user manager 123. In this embodiment, the client device 106 may request to the logical network user manager 123 for operations such as adding, importing, editing or removing users and/or permissions from the list of users of the logical network gateway 145. The request from the client device 106 to the logical network user manager 123 may be made via the browser 161, the logical network application 169 or another application capable of making a programmatic service request.

In a second embodiment, users of the logical network gateway 145 and their associated permissions are managed by the user AAA service 147 on the computing device 143 or another computing device accessible to the logical network gateway 145. In a third embodiment, management of the users of the logical network gateway 145 may be separated from the management of the user permissions related to the logical network gateway 145.

Once the logical network configuration manager 121 receives the necessary configuration data via one or more programmatic service requests from the client device 106, the logical network configuration manager 121 creates the logical network 141, provisions any computing devices 143 and configures the logical network gateway 145 via a programmatic service request. The aforementioned operations associated with creating and configuring the logical network 141 may be limited to users having administrative privileges.

Furthermore, the configuration of the logical network 141 may be preserved in the logical network configuration data 131, such that the end-users may access a previously configured logical network 141. To this end, the client device 106 may initiate establishment of a logical network tunnel 149 to the logical network gateway 145. The logical network gateway 145 may authenticate credentials from the client device 106 using the logical network user manager 123, the user AAA service 147 on a computing device 143 or another authentication service.

Upon successful authentication of the client device 106, the logical network tunnel 149 may be fully established between the client device 106 and the logical network gateway 145. Once the logical network tunnel 149 is established, the client device 106 may participate in the logical network 141 subject to permissions associated with the client device 106, credentials associated with user accounts 134, and/or other possible criteria. In some embodiments, the logical network gateway 145 may transmit a network page suitable for rendering a user interface 166 in the display 157 of the client device 106. In these embodiments, the user interface 166 may facilitate establishing communications with the computing device(s) 143 of the logical network 141 and/or other computing devices via the logical network tunnel 149.

For example, the network page may be rendered by the browser 161 to produce a user interface 166. Within the user interface 166 of the browser 161 (FIG. 1), an access region 203 may be present that facilitates access to computing devices 143 (FIG. 1) of the logical network 141 (FIG. 1) and/or other computing devices via the logical network tunnel 149 (FIG. 1). The access region may provide links, such as a list of uniform resource identifiers (URIs) corresponding to the various computing devices available to the client device 106. Furthermore, the access region may contain a logical network address bar for entering URIs that may be distinct from an address bar for the browser 161 itself. Within the logical network address bar, an operator may input a URI corresponding to the computing device 143 of the logical network 141 to which access is sought, as well as potentially other computing devices beyond the logical network 141.

Figure 2A:
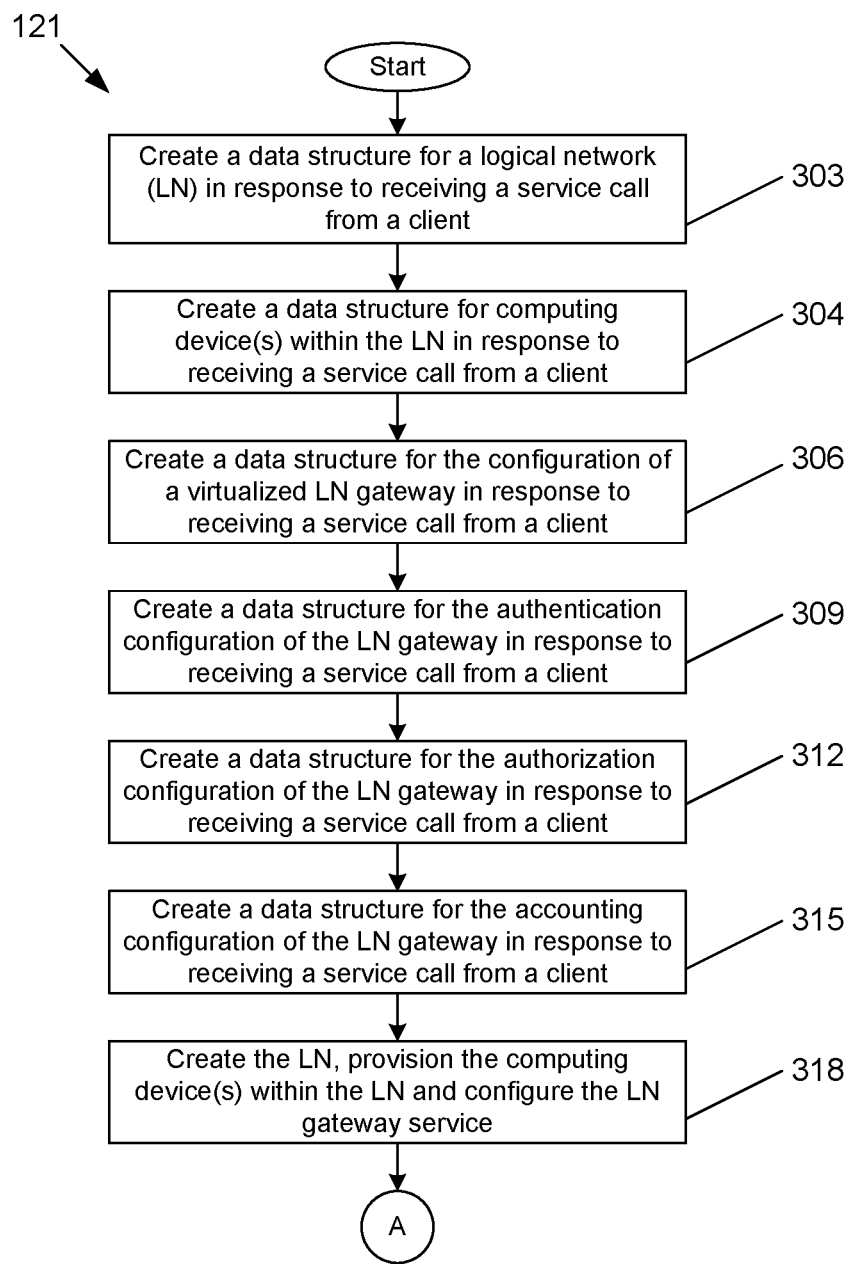
FIG. 2A is a flowchart illustrating one example of functionality implemented as portions of a logical network configuration manager executed in the networked environment of FIG. 1 according to various embodiments of the present disclosure.
Figure 2B:
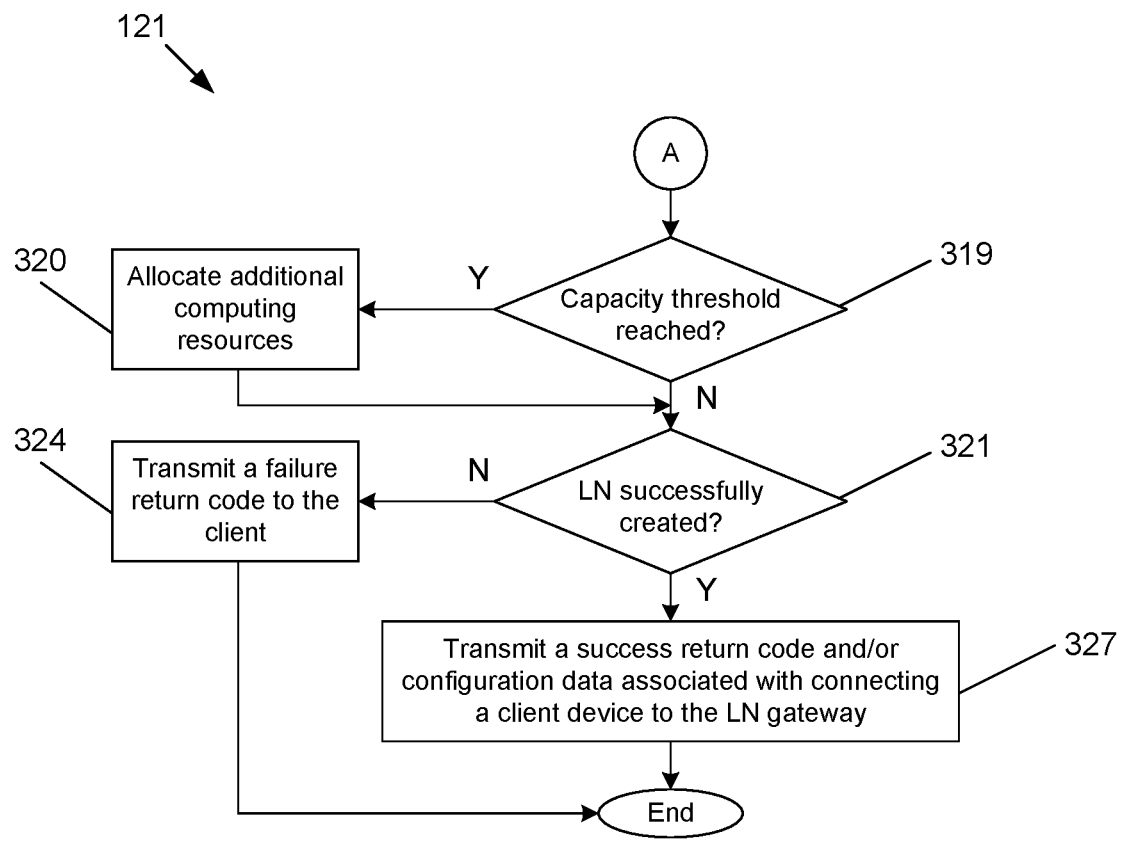
FIG. 2B is a flowchart illustrating one example of functionality implemented as portions of a logical network configuration manager executed in a computing device in the networked environment of FIG. 1 according to various embodiments of the present disclosure.

Turning now to FIGS. 2A and 2B, shown are flowcharts that provides one example of the operation of a portion of the logical network configuration manager 121 (FIG. 1) according to various embodiments. It is understood that the flowcharts of FIGS. 2A and 2B provide merely an example of the many different types of functional arrangements that may be employed to implement the operation of the portion of the logical network configuration manager 121 as described herein. As an alternative, the flowcharts of FIGS. 2A and 2B may be viewed as depicting an example of steps of a method implemented in the computing device 103 (FIG. 1) according to one or more embodiments.

Beginning with box 303, the logical network configuration manager 121 creates a data structure for a logical network 141 (FIG. 1) after receiving a service call from the client device 106 (FIG. 1) to create a logical network 141. The request to the logical network configuration manager 121 from the client device 106 may be made using various protocols, such as hypertext transfer protocol (HTTP), HTTPS, and/or middle frameworks including remote procedure calls, SOAP, REST, Windows Communication Foundation, and other frameworks. The service call from the client device 106 may further configure the data structure of the logical network 141 to include one or more network address allocations, such as a range of IP addresses, which may be used for devices participating within the logical network 141.

Next, at box 304, the logical network configuration manager 121 creates a data structure to include one or more computing devices 143 (FIG. 1) within the logical network 141 after receiving a service call from the client device 106 to include one or more computing devices 143 within the logical network 141. As a non-limiting example, the computing device(s) 143 may be cloud computing device(s), virtual computing device(s) or any computing device(s) capable of being included within the logical network 141. In various embodiments, the computing device(s) 143 may only be able to communicate within the logical network 141 or with devices on other networks such as the Internet or other logical networks 141.

Subsequently, at box 306, the logical network configuration manager 121 creates a data structure to associate a logical network gateway 145 (FIG. 1) with the logical network 141 upon receiving a service call from the client 106 to associate a logical network gateway 145 with the logical network 141. As previously described, the logical network gateway 145 may be a virtual machine permitting users of remote devices to communicate within the logical network 141 through the use of logical network tunnels 149. The logical network tunnels 149 (FIG. 1) may be established using HTTPS, SSL/TLS, and/or other protocols as can be appreciated.

Moving on, in box 309, the logical network configuration manager 121 creates a data structure to configure the logical network gateway 145 for authenticating users after receiving a service call from the client 106 to configure the logical network gateway 145 for authenticating users. The authentication function is carried out to positively identify users and the logical network gateway 145 may authenticate users locally in the logical network gateway 145, or it may rely in whole or in part on other devices to perform this function. If the logical network gateway 145 relies upon other devices to perform these functions, the logical network gateway 145 may communicate with these other devices using TACACS+, RADIUS, Diameter or other similar protocols as can be appreciated. In one embodiment, the function of authenticating users of the logical network gateway 145 may be carried out by the logical network user manager 123 (FIG. 1). In another embodiment, the functions of authenticating the users of the logical network gateway 145 may be carried out by the computing device 143 or another computing device accessible to the logical network gateway 145.

Next, in box 312, the logical network configuration manager 121 creates a data structure to configure the user permissions of the logical network gateway 145 upon receiving a service call from the client 106 to configure the user permissions of the logical network gateway 145. The authorization function may be carried out to determine the permissions assigned to a user. The logical network gateway 145 may determine the authorization of users locally in the logical network gateway 145, or it may rely in whole or in part on other devices to perform this function. If the logical network gateway 145 relies upon other devices to perform these functions, the logical network gateway 145 may communicate with these other devices using TACACS+, RADIUS, Diameter or other similar protocols as can be appreciated. In one embodiment, the function of authorizing users of the logical network gateway 145 may be carried out by the logical network user manager 123. In another embodiment, the functions of authenticating the users of the logical network gateway 145 may be carried out by the computing device 143 or another computing device accessible to the logical network gateway 145.

Subsequently, in box 315, the logical network configuration manager 121 creates a data structure to configure an accounting of usage for each user after receiving a service call from the client 106 to configure an accounting of usage for each user. As non-limiting examples, an accounting of usage may include connection time, bandwidth used, the number of logical network tunnels 149 established and other metrics as can be appreciated. The logical network gateway 145 may store the accounting of usage locally in the logical network gateway 145, or it may rely in whole or in part on other devices to perform this function. If the logical network gateway 145 relies upon other devices to perform these functions, the logical network gateway 145 may communicate with these other devices using TACACS+, RADIUS, Diameter or other similar protocols as can be appreciated. In one embodiment, the function of accounting of usage for the logical network gateway 145 may be carried out by the logical network user manager 123. In another embodiment, the functions of accounting of usage for the logical network gateway 145 may be carried out by the computing device 143 or another computing device accessible to the logical network gateway 145.

Furthermore, the data structures corresponding to the authentication, authorization and accounting functions of the logical network gateway 145 discussed in boxes 309-315 may be configured such that they may be carried out by different devices. As a non-limiting example, the authentication function may be performed using an LDAP server accessible over the Internet, and the authorization function may be performed by the logical network user manager 123 using the TACACS+ protocol. Continuing with the example, the accounting of usage function may be performed using a computing device 143 using the Diameter protocol.

Next, in box 318, the logical network configuration manager 121 creates the logical network 141, provisions any computing devices 143 and configures the logical network gateway 145 via a programmatic service request. The service call may include the data structures created at least from the service calls received from the client device 106. Subsequently, in box 319, if the computing resources currently allocated to the operation of the logical network 141 and logical network gateway 145 have reached a maximum threshold, then, in box 320, the logical network configuration manager 121 or another service may allocate additional computing resources as needed.

Moving on, in box 321, if the logical network configuration manager 121 fails to create the logical network 141 and/or receives a return code from the logical network gateway 145 indicating a failure, or fails to receive any return code within a timeout period, in box 324, the logical network configuration manager 121 may notify the client device 106 of the failure. Thereafter, execution of the portion of the logical network configuration manager 121 ends as shown.

Alternatively, in box 327, the logical network configuration manager 121 may transmit a return code indicating the logical network 141 was successfully created and configured, and/or the logical network configuration manager 121 may transmit the configuration data necessary for the client device 106 to establish a logical network tunnel 149 to the logical network gateway 145. The configuration data may be in the form of a document to be read by a user, a file that may be interpreted by the logical network application 169 or other application on the client device 106 or another form as may be appreciated. The configuration data may include instructions to establish the logical network tunnel 149, the types of logical network tunnels 149 supported by the logical network gateway 145, the network address(es) of the logical network gateway(s) 145, etc. Thereafter, execution of the portion of the logical network configuration manager 121 ends as shown.

Figure 3:
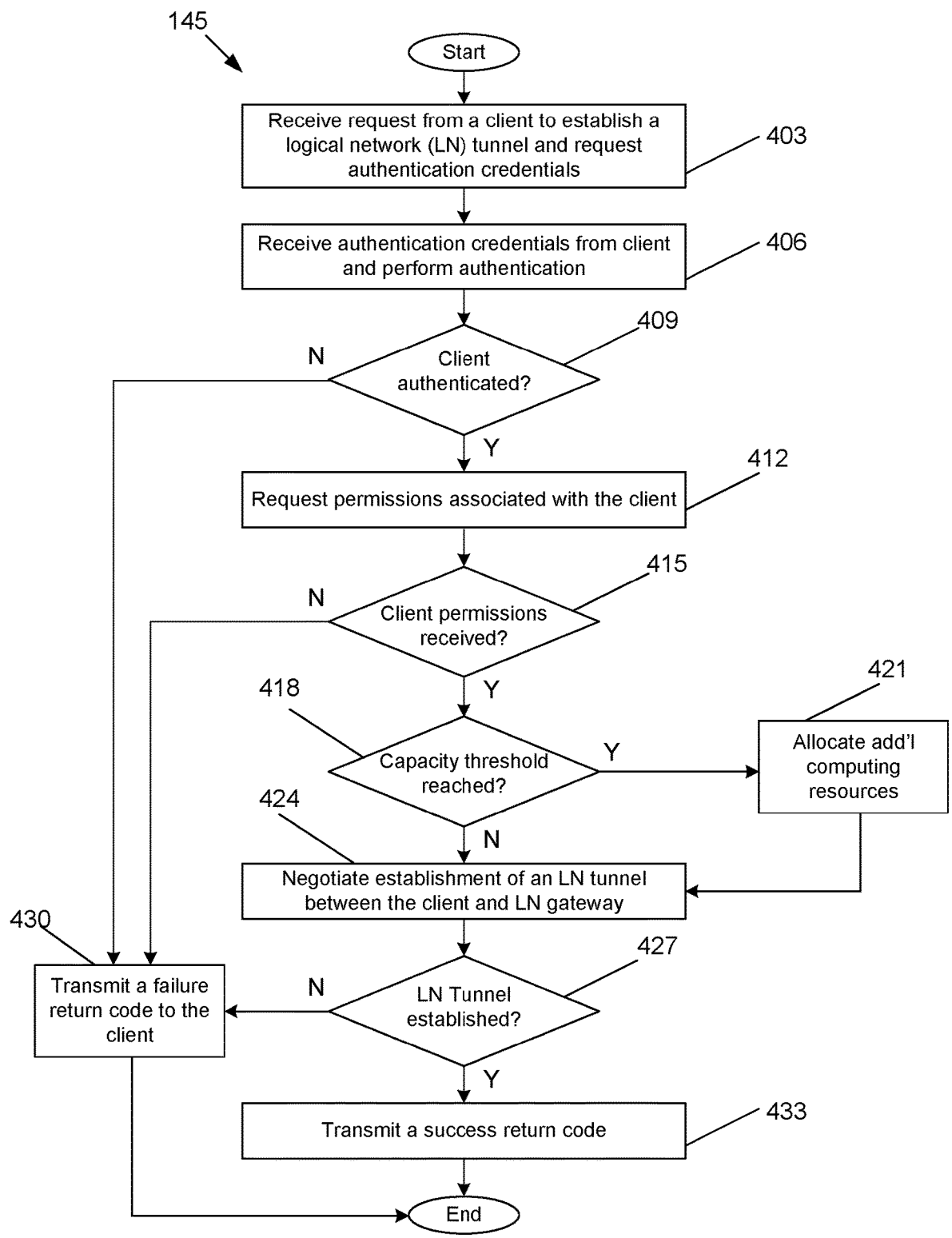
FIG. 3 is a flowchart illustrating one example of functionality implemented as portions of a logical network gateway executed in a computing device in the networked environment of FIG. 1 according to various embodiments of the present disclosure.

Moving on to FIG. 3, shown is a flowchart that provides one example of the operation of a portion of the logical network gateway 145 (FIG. 1) according to various embodiments. It is understood that the flowchart of FIG. 3 provides merely an example of the many different types of functional arrangements that may be employed to implement the operation of the portion of the logical network gateway 145 as described herein. As an alternative, the flowchart of FIG. 3 may be viewed as depicting an example of steps of a method implemented in the computing device 103 (FIG. 1) according to one or more embodiments.

Beginning with box 403, the logical network gateway 145 receives a request from a client device 106 (FIG. 1) to establish a logical network tunnel 149 (FIG. 1). In response, the logical network gateway 145 may request authentication credentials from the client device 106. The initial client request may be accomplished by the browser 161 (FIG. 1), the logical network application 169 (FIG. 1), and/or another application using an HTTPS or SSL/TLS handshake, or through other techniques as can be appreciated. Next, in box 406, the logical network gateway 145 may receive and authenticate credentials from the client device 106 using the logical network user manager 123 (FIG. 1), the user AAA service 147 (FIG. 1) on a computing device 143 (FIG. 1) or another authentication service. To this end, the authentication may be carried out using TACACS+, RADIUS, Diameter or other similar protocols as can be appreciated.

If, in box 409, the client authentication fails or no response is received within a timeout period, in box 430, the logical network gateway 145 transmits a failure code to the client and execution of this portion of the logical network gateway 145 ends as shown. Alternatively, if the client authentication succeeds, in box 412, the logical network gateway 145 may request permissions associated with the client using the logical network user manager 123, the user AAA service 147 on a computing device 143 or another authorization service. To this end, the authorization may be carried out using TACACS+, RADIUS, Diameter or other similar protocols as can be appreciated.

If, in box 415, the client fails to have the necessary permissions or no response is received within a timeout period, in box 430, the logical network gateway 145 transmits a failure code to the client and execution of this portion of the logical network gateway 145 ends as shown. Alternatively, in box 418, if the computing resources currently allocated to the operation of the logical network 141 (FIG. 1) and the logical network gateway 145 have reached a maximum threshold, then, in box 421, the logical network gateway or another service may allocate additional computing resources as needed.

Next, in box 424, the logical network gateway 145 may begin or continue negotiating the establishment of the logical network tunnel 149 using HTTPS, SSL/TLS, or through other techniques as can be appreciated. If, in box 427, the logical network tunnel 149 fails to establish, the logical network gateway 145 may, in box 430, transmit an appropriate return code to the client. Thereafter, execution of this portion of the service offered by logical network gateway 145 ends as shown. Alternatively, if the logical network tunnel 149 is successfully established, the logical network gateway 145 may, in box 433, transmit an appropriate return code to the client. In some embodiments, the logical network gateway 145 may further transmit a network page suitable for rendering a user interface 166 (FIG. 1) in the display 157 (FIG. 1). In these embodiments, the user interface 166 may facilitate establishing communications with the computing device(s) 143 of the logical network 141 via the logical network tunnel 149. Thereafter, execution of this portion of the service offered by logical network gateway 145 ends as shown.

Figure 4:
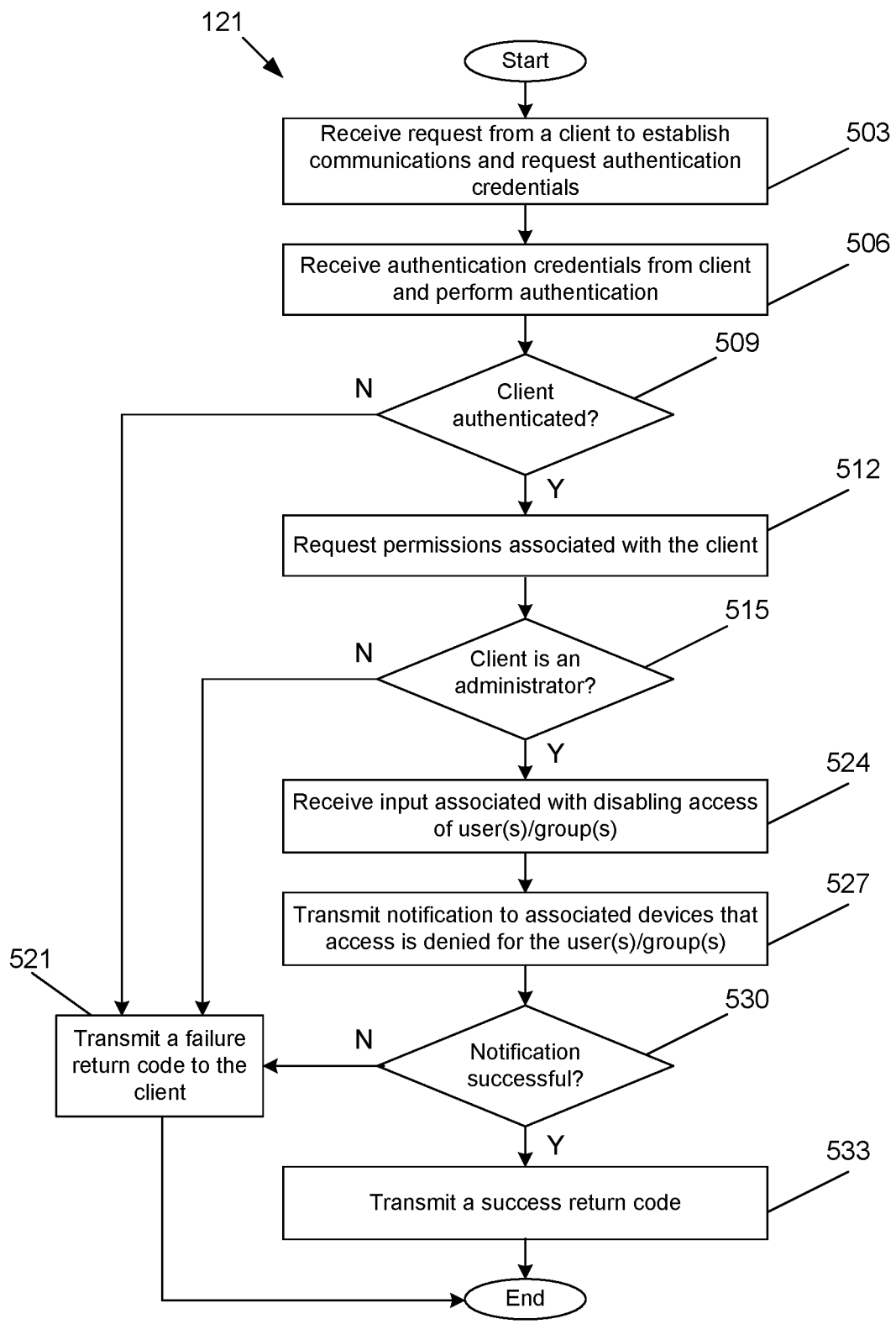
FIG. 4 is a flowchart illustrating another example of functionality implemented as portions of a logical network configuration manager executed in a computing device in the networked environment of FIG. 1 according to various embodiments of the present disclosure.

Referring next to FIG. 4, shown is a flowchart that provides one example of the operation of a portion of the logical network configuration manager 121 according to various embodiments. It is understood that the flowchart of FIG. 4 provides merely an example of the many different types of functional arrangements that may be employed to implement the operation of the portion of the logical network configuration manager 121 as described herein. As an alternative, the flowchart of FIG. 4 may be viewed as depicting an example of steps of a method implemented in the computing device 103 (FIG. 1) according to one or more embodiments.

This portion of the execution of the logical network configuration manager 121 may be executed in response to a request from a client device 106 (FIG. 1) to disable access to the logical network 141 (FIG. 1) for one or more users, groups, and/or other client devices 106. Beginning with box 503, the logical network configuration manager 121 receives a request from a client device 106 to establish communications over the network 109 (FIG. 1). In response, the logical network gateway 145 (FIG. 1) may request authentication credentials from the client device 106. The initial client request may be accomplished using HTTP, HTTPS, a middleware framework or other techniques as can be appreciated. Next, in box 506, the logical network configuration manager 121 may receive and authenticate credentials from the client device 106 using the logical network user manager 123 (FIG. 1), the user AAA service 147 (FIG. 1) on a computing device 143 (FIG. 1) or another authentication service. To this end, the authentication may be carried out using TACACS+, RADIUS, Diameter or other similar protocols as can be appreciated.

If, in box 509, the client authentication fails or no response is received within a timeout period, in box 521, the logical network configuration manager 121 transmits an appropriate failure code to the client and execution of this portion of the logical network configuration manager 121 ends as shown. Alternatively, if the client authentication succeeds, in box 512, the logical network configuration manager 121 may request permissions associated with the client using the logical network user manager 123, the user AAA service 147 on a computing device 143 or another authorization service. To this end, the authorization may be carried out using TACACS+, RADIUS, Diameter or other similar protocols as can be appreciated.

Then, in box 515, the logical network configuration manager 121 determines if the client possesses the necessary authorization to disable other user accounts. The authorization may at least in part be determined by the permissions associated with the client account as identified during the authorization action. If the client does not possesses the necessary authorization, or if no response is received within a timeout period, in box 521, the logical network configuration manager 121 transmits an appropriate failure code to the client and execution of this portion of the logical network configuration manager 121 ends as shown. Alternatively, in box 524, if the client is authorized to disable a user account, the logical network configuration manager 121 may receive input associated with disabling a user account. Such input may be related to the account identifier for the account that is to be disabled, duration for which the account is disabled, time at which the account is to be disabled, whether the account should be disconnected from a current logical network tunnel 149 (FIG. 1), etc. Similarly, more than one account and/or groups may also be disabled using similar techniques.

Next, in box 527, the logical network configuration manager 121 may transmit the information associated with disabling the account(s)/group(s) to the logical network gateway 145, the logical network user manager 123, the user AAA service 147 on a computing device 143 and/or another configured authentication/authorization service, in addition to potentially other actions that may be taken. Subsequently, in box 530, if the logical network configuration manager 121 fails to receive a successful acknowledgement, or any acknowledgement within a timeout period, in box 521, the logical network configuration manager 121 transmits an appropriate failure code to the client and execution of this portion of the logical network configuration manager 121 ends as shown.

Alternatively, if the notifications sent are successfully acknowledged by the associated devices and/or service, then the logical network configuration manager 121 may, in box 533, transmit an appropriate return code to the client and execution of this portion of the logical network configuration manager 121 ends as shown.

Figure 5:
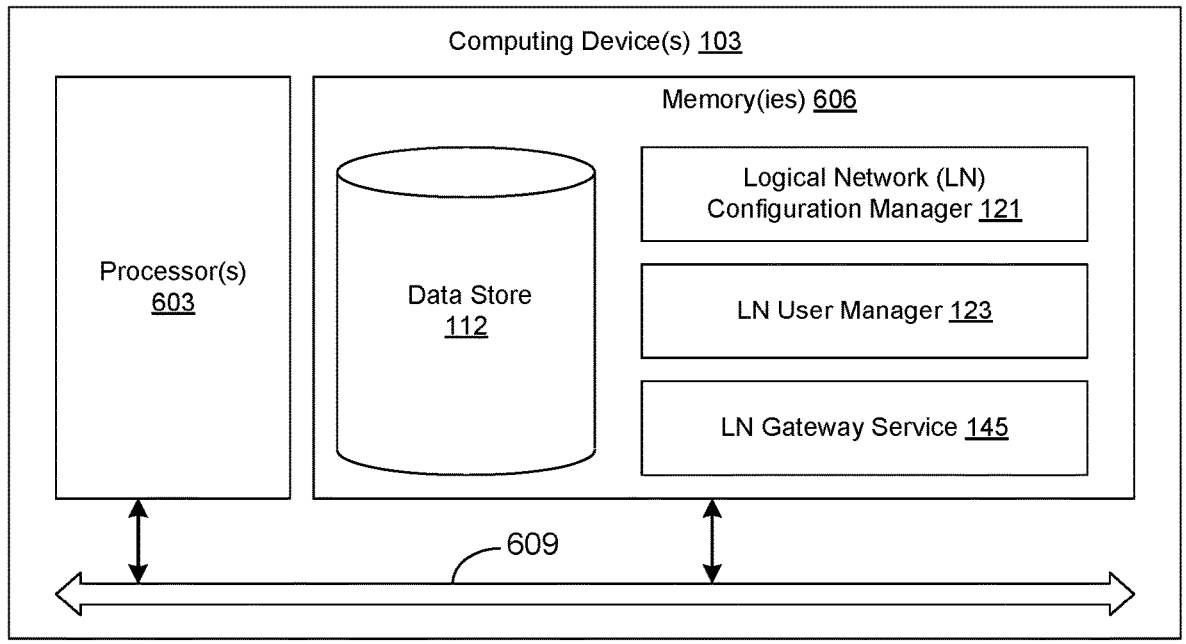
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the logical network configuration manager 121, the logical network user manager 123, the logical network gateway 145 and potentially other applications. Also stored in the memory 606 may be a data store 112 and other data. In addition, an operating system may be stored in the memory 606 and executable by the processor 603.

Figure 6:
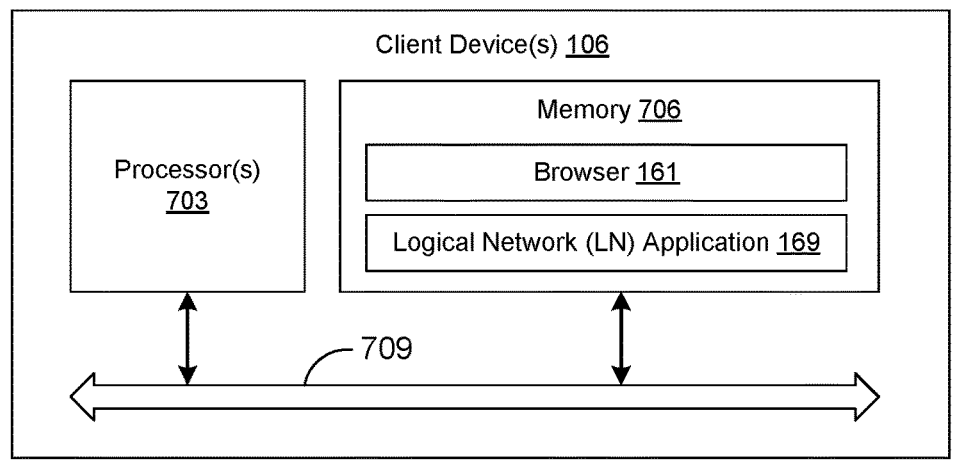
FIG. 6 is a schematic block diagram that provides one example illustration of a client computing device employed in the networked environment of FIG. 1 according to various embodiments of the present disclosure.

Turning now to FIG. 6, shown is a schematic block diagram of the client device 106 according to an embodiment of the present disclosure. The client device 106 includes at least one processor circuit, for example, having a processor 703 and a memory 706, both of which are coupled to a local interface 709. To this end, the client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capabilities. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the browser 161, logical network application 169, and potentially other applications. In addition, an operating system may be stored in the memory 706 and executable by the processor 703.

With reference to FIGS. 5 and 6, it is understood that there may be other applications that are stored in the memories 606 or 706 and are executable by the respective processors 603 or 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 606 or 706 and are executable by the respective processors 603 or 703. In this respect, the term "executable" means a program file that is in a form that can ultimately be run by the processors 603 or 703. Examples of executable programs may be, for example, a compiled program that can be translated into machine code in a format that can be loaded into a random access portion of the memories 606 or 706 and run by the respective processors 603 or 703, source code that may be expressed in proper format such as object code that is capable of being loaded into a random access portion of the memories 606 or 706 and executed by the respective processors 603 or 703, or source code that may be interpreted by another executable program to generate instructions in a random access portion of the memories 606 or 706 to be executed by the respective processors 603 or 703, etc. An executable program may be stored in any portion or component of the memories 606 or 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 606 or 706 are defined herein as including both volatile and nonvolatile memory and data storage components. Volatile components are those that do not retain data values upon loss of power. Nonvolatile components are those that retain data upon a loss of power. Thus, the memories 606 or 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the respective processors 603 or 703 may represent multiple processors and the respective memories 606 or 706 may represent multiple memories that operate in parallel processing circuits, respectively. In such a case, the local interfaces 609 or 709 may be an appropriate network 109 (FIG. 1) that facilitates communication between any two of the respective multiple processors 603 or 703, between any respective processors 603 or 703 and any of the respective memories 606 or 706, or between any two of the respective memories 606 or 706, etc. The local interfaces 609 or 709 may comprise additional systems designed to coordinate this communication, including, for example, performing load balancing. The processors 603 or 703 may be of electrical or of some other available construction.

Although the logical network configuration manager 121, logical network user manager 123, logical network gateway 145, browser 161, logical network application 169, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A-4 show the functionality and operation of an implementation of portions of the logical network configuration manager 121 and logical network gateway 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 603 or 703 in a computer system or other system. The machine code may be converted from the source code, etc. If embodied in hardware, each block may represent a circuit or a number of interconnected circuits to implement the specified logical function(s).

Although the flowcharts of FIGS. 2A-4 show a specific order of execution, it is understood that the order of execution may differ from that which is depicted. For example, the order of execution of two or more blocks may be scrambled relative to the order shown. Also, two or more blocks shown in succession in FIGS. 2A-4 may be executed concurrently or with partial concurrence. Further, in some embodiments, one or more of the blocks shown in FIGS. 2A-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the logical network configuration manager 121, logical network user manager 123, logical network gateway 145, browser 161, and logical network application 169, that comprises software or code can be embodied in any non-transitory computer-readable medium for use by or in connection with an instruction execution system such as, for example, processors 603 or 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
    create, in response to receiving a service call, a virtual network comprising a virtual network gateway based at least in part on configuration data;

establish an encrypted network tunnel to the virtual network in response to a request from a client to establish the encrypted network tunnel;

allocate, in response to a usage of a first computing resource assigned to the virtual network gateway exceeding a predefined threshold, an available second computing resource to the virtual network gateway to augment the first computing resource, wherein the second computing resource is assigned to the encrypted network tunnel; and transmit at least the configuration data to a client device.

2. The system of claim 1, wherein the machine-readable instructions, when executed by the processor, further cause the computing device to at least limit access of the client device to a portion of the virtual network specified in a permission, the permission being associated with the client device.

3. The system of claim 2, wherein the machine-readable instructions that limit access of the client device to the portion of the virtual network specified in the permission, when executed by the processor, further cause the computing device to at least limit the access of the client device from a network address.

4. The system of claim 1, wherein the machine-readable instructions, when executed by the processor, further cause the computing device to at least terminate a connection between the client device and the virtual network gateway.

5. The system of claim 1, wherein the machine-readable instructions, when executed by the processor, further cause the computing device to at least:

receive authentication credentials from the client device; and assign a network address to the client device in response to determining that the authentication credentials are valid.

6. The system of claim 1, wherein the machine-readable instructions, when executed by the processor, further cause the computing device to at least identify a permission associated with a client, the permission specifying a limitation of the client device on use of the encrypted network tunnel.

7. A method, comprising:

creating, by a computing device in response to receiving a service call, a virtual network comprising a virtual network gateway based at least in part on configuration data;

establishing an encrypted network tunnel to the virtual network; and allocating, by the computing device in response to a usage of a first computing resource assigned to the virtual network gateway exceeding a predefined threshold, an available second computing resource to the virtual network gateway to augment the first computing resource.

8. The method of claim 7, wherein allocating the available second computing resource to the virtual network is in response to determining a capacity threshold has been reached.

9. The method of claim 7, further comprising limiting, by the computing device, access of the client device to a portion of the virtual network specified in a permission, the permission being associated with the client device.

10. The method of claim 9, wherein limiting access of the client device to the portion of the virtual network specified in the permission limits the access of the client device from a specified network address.

11. The method of claim 7, further comprising terminating, by the computing device, a connection between the client device and the virtual network gateway.

12. The method of claim 7, further comprising: receiving, by the computing device, authentication credentials from the client device; and assigning, by the computing device, a network address to the client device in response to determining that the authentication credentials are valid.

13. The method of claim 7, further comprising identifying, by the computing device, a permission associated with a client, the permission specifying a limitation of the client device on use of an encrypted network tunnel.

14. A method, comprising:

establishing, by a computing device, an encrypted network tunnel to a logical network in response to a request from a client to establish the encrypted network tunnel;

allocating, by the computing device, a first computing resource to the encrypted network tunnel;

allocating, by the computing device and in response to a determination that consumption of the first computing resource exceeds a predefined threshold, a second computing resource to the encrypted network tunnel to augment the first computing resource assigned to the encrypted network tunnel.

15. The method of claim 14, further comprising identifying, by the computing device, a permission associated with the client, the permission specifying a limitation of a client device on use of the encrypted network tunnel.

16. The method of claim 15, wherein identifying the permission further comprises:

sending, by the computing device, a client credential to an authentication service; and receiving, by the computing device, the permission from the authentication service.

17. The method of claim 15, further comprising limiting, by the computing device, usage of the encrypted network tunnel by the client device to a permitted usage specified in the permission.

18. The method of claim 14, wherein allocating the first computing resource to the encrypted network tunnel is done in response to authenticating a client, authenticating the client comprising:

sending, by the computing device, a client credential to an authentication service; and receiving, by the computing device, a response from the authentication service, the response indicating that the client is authenticated.

19. The method of claim 14, wherein the logical network comprises at least one virtual machine.

* * * * *